United States Patent [19]
Tanimoto et al.

[11] Patent Number: 5,360,839
[45] Date of Patent: Nov. 1, 1994

[54] CATHODIC ELECTRODEPOSITION PAINT

[75] Inventors: Motoi Tanimoto; Tatsuo Yoshida, both of Suita; Kenshiro Tobinaga, Kawanishi; Yuji Toyoda, Takatsuki, all of Japan

[73] Assignee: Nippon Paint Co., Ltd., Osaka, Japan

[21] Appl. No.: 45,431

[22] Filed: Apr. 13, 1993

[30] Foreign Application Priority Data

Apr. 14, 1992 [JP] Japan .................................. 4-120110

[51] Int. Cl.$^5$ ............................ C08J 3/20; C08K 3/20; C08L 63/00
[52] U.S. Cl. ................................... 523/414; 523/402; 523/404; 523/406; 523/410; 523/411; 523/415; 523/417; 524/548; 524/555; 524/558
[58] Field of Search ............... 523/402, 404, 406, 410, 523/411, 414, 415, 417; 524/548, 555, 558

[56] References Cited

U.S. PATENT DOCUMENTS 4,335,028  6/1982  Ting et al. .......................... 524/504
5,185,065  2/1993  Chung et al. ....................... 523/415

Primary Examiner—Paul R. Michl
Assistant Examiner—Patrick Niland
Attorney, Agent, or Firm—Millen, White, Zelano & Branigan

[57] ABSTRACT

Cathodic electrodeposition paints are rendered hardly susceptible to oil droplet-induced craters by incorporating an amine-modified acrylic copolymer of t-butyl (meth)acrylate with a hydroxyl group-containing monomer and an oxirane ring-containing monomer in the form of an aqueous emulsion. The amine-modified acrylic copolymer may be an adduct with a half blocked organic diisocyanate. The paint gives a cured film substantially free from oil droplet-induced craters and having a good adhesion to an overcoating and a good surface smoothness.

12 Claims, No Drawings

CATHODIC ELECTRODEPOSITION PAINT

BACKGROUND OF THE INVENTION

This invention relates to a cathodic electrodeposition paint.

When electrodeposition paints, particularly wet films thereof applied on a substrate are fouled with oil droplets scattered from the surrounding environment, the oil droplets expel the surrounding paint film radially outward to create many crater-like recesses in the film even after baking. Several methods are known to solve this problem including the incorporation of kaolin into the paint formulation to increase the pigment concentration and/or the use of vehicle resins having a relatively high molecular weight and thus a high viscosity level to thereby decrease the fluidity of paint during the baking step. However, these known methods are not satisfactory because the smoothness of the resulting cured film and its adhesion to overcoatings are impaired when attempting to fully diminish the susceptibility to oil droplet-induced craters.

Accordingly, a need exists for an electrodeposition paint which is hardly susceptible to oil droplet-induced craters without compromising other properties of the paint such as film smoothness and adhesion to an overcoating.

SUMMARY OF THE INVENTION

According to the present invention, the following cationic acrylic resin is added to a cathodic electrodeposition paint to eliminate or minimize its susceptibility to oil droplet-induced craters. Said cationic acrylic resin is an amine-modified acrylic copolymer produced by reacting a secondary amine and an acrylic copolymer having a number average molecular weight from 1,000 to 20,000 and having monomeric constituents comprising (a) t-butyl acrylate or methacrylate in a proportion sufficient to provide a glass transition temperature (Tg) of at least 50° C., (b) a hydroxyl group-containing monomer in a proportion sufficient to provide a hydroxyl number greater than 40, and (c) an oxirane ring-containing monomer in a proportion sufficient to provide an oxirane ring content from 0.5 to 2.5 mmol/g. The amine-modified acrylic copolymer is then emulsified as such or after having been reacted with a half blocked diisocyanate in an aqueous medium containing a neutralizing acid. The emulsion thus prepared is added to a cathodic paint in a proportion between 1% and 30%, preferably between 5% and 20% by weight of the total resin content of the entire composition. The balance of the total resin content preferably consists of an amine-modified epoxy resin and a blocked polyisocyanate compound.

By incorporating the above amine-modified acrylic copolymer, the cathodic electrodeposition paint becomes hardly susceptible to oil droplet-induced craters. Nevertheless, the paint gives a cured film having a smooth surface and a sufficient adhesion to an overcoating applied thereon.

DESCRIPTION OF THE PREFERRED EMBODIMENT

It has been known and in commercial practice, as stated earlier, to diminish oil droplet-induced craters of electrodeposition paints by increasing the pigment concentration in the paints. This method, however, results in a decrease in the smoothness of resulting cured films.

We have found that the susceptibility of cathodic electrodeposition paints to the oil droplet-induced craters may be diminished without compromising the film smoothness by adding to the paint formulation a cationic acrylic copolymer having a Tg above 50° C. of which having monomeric constituents including t-butyl (meth)acrylate. However, since the solubility parameter (SP) of the copolymer decreases with increase in the proportion of t-butyl (meth)acrylate monomer, the addition of an amine-modified acrylic copolymer having a substantial content of t-butyl (meth) acrylate to cathodic electrodeposition paints will adversely affect the adhesion of resulting films to an overcoating applied thereon.

We have found that the decrease in SP level of the amine-modified acrylic copolymer may be compensated for by incorporating in its monomer constituents a hydroxyl group-containing monomer in a proportion sufficient to provide a hydroxyl number greater than 40. Since the starting acrylic copolymer must have a number of reaction sites with a secondary amine, its monomeric constituents should include oxirane ring-containing monomers in a proportion sufficient to provide an oxirane ring content from 5 to 2.5 mmol/g.

Accordingly, the monomeric constituents of the starting acrylic copolymer contain (a) t-butyl (meth)acrylate in a proportion sufficient to provide a Tg of at least 50° C., (b) a hydroxyl group-containing monomer such as 2-hydroxyethyl (meth)acrylate, 2-hydroxypropyl (meth)acrylate or polycaprolactone glycol (meth)acrylate (e.g. PLACCEL FM-1 sold by Daicel Chemical Industries, Ltd.) in a proportion sufficient to provide a hydroxyl number greater than 40, (c) an oxirane ring-containing monomer such as glycidyl (meth)acrylate in a proportion sufficient to provide an oxirane ring content between 0.5 to 2.5 mmol/g, and optionally a monomer other than monomers (a), (b) and (c) such as methyl (meth)acrylate, ethyl (meth)acrylate, n-propyl (meth)acrylate, isopropyl (meth)acrylate, n-butyl (meth)acrylate, isobutyl (meth)acrylate, cyclohexyl (meth) acrylate, 2-ethylhexyl (meth)acrylate, dodecyl (meth) acrylate, styrene, vinyltoluene, α-methylstyrene, (meth) acrylonitrile, (meth)acrylamide, vinyl acetate and the like. The monomer mixture is then polymerized using a conventional polymerization method such as the solution polymerization technique until a number average molecular weight from 1,000 to 20,000, preferably from 2,000 to 20,000 is reached.

The amine-modified acrylic copolymer used in the present invention is produced by reacting the starting acrylic copolymer with a secondary amine to open the oxirane ring with the secondary amine. Examples of usable secondary amines include N,N-diethylamine, N,N-dibutylamine, N-methylethanolamine, diethanolamine and the like. It is preferable for the secondary amine to have, in addition to the secondary amino group, a hydroxyl or ketiminized primary amino group so that the amine-modified acrylic copolymer may be crosslinked with a block polyisocyanate. Alternatively, the amine-modified acrylic copolymer may be rendered self-crosslinkable by reacting with a half blocked diisocyanate compound. To this end an organic diisocyanate such as tolylenediisocyanate (TDI), isophoronediisocyanate (IPDI), hexamethylenediisocyanate (HDI), or diphenylmethanediisocyanate (MDI) is reacted with a blocking agent so that one of two isocyanate groups is blocked. Usable blocking agents are well known and include methanol, ethanol, 2-ethylhexanol, ethylene glycol monoalkyl ethers, diethylene glycol monoalkyl ethers, lactams, oximes and the like. At least one mole of the half blocked diisocyanate is reacted per mole of the amine-modified acrylic copolymer.

The amine-modified acrylic copolymer or its adduct with a half-blocked diisocyanate is then emulsified in an aqueous medium containing a neutralizing acid such as phosphoric, acetic, propionic or lactic acid in an amount to achieve at least 30% neutralization. Since the Tg of the copolymer is relatively high, the emulsification thereof will require a relatively high temperature. If necessary a known emulsifier may be used.

Since the amine-modified acrylic copolymer or its half-blocked diisocyanate adduct is used as an auxiliary resin or additive but not as a primary vehicle resin, the cathodic electrodeposition paint of the present invention must contain another cationic film-forming resin as the primary vehicle resin. A variety of film-forming resins usable in cathodic electrodeposition paints are known. These resins generally have positively chargeable hydrophilic groups such as amino groups and a plurality of crosslinking sites in a three dimensional network. Since the auxiliary resin of the present invention is crosslinked with a blocked polyisocyanate compound, the primary vehicle resin is selected from those having the same curing mechanism. Examples thereof include amine-modified epoxy resins as disclosed in Japanese Patent Publication (Kokoku) Nos. 4978/1979 and 34186/1981, amine-modified polyurethane resins as disclosed in Japanese Laid Open Patent Application (Kokai) Nos. 15449/1979 and 115476/1980, and amine-modified acrylic resins as disclosed in Japanese Patent Publication No. 60516/1989. Since cationic resins and crosslinkers used in cathodic electrodeposition paints are well known in the coating industry and do not constitute part of the present invention, it will not be necessary to explain further details thereof. The primary vehicle resin and the crosslinker are dispersed also in an aqueous medium containing an acid such as phosphoric, acetic, propionic or lactic acid in an amount sufficient to achieve at least 30% neutralization. The aqueous medium is water or a mixture of water and a water-miscible organic solvent such as ethylcellosolve, propylcellosolve, butylcellosolve, ethylene glycol dimethyl ether, diacetone alcohol, 4-methoxy-4-methylpentanone-2 or methyl ethyl ketone. A minor proportion of water-immiscible solvents such as toluene, xylene, methyl isobutyl ketone or 2-ethylhexanol may be included in the aqueous medium.

The auxiliary resin is added to a cathodic paint in a proportion from 1 to 30%, preferably from 5 to 20% by weight of the total resin content of the paint.

The cathodic paint of the present invention may contain pigments such as titanium dioxide, carbon black, ferric oxide, precipitated barium sulfate, silica, kaolin, precipitated calcium carbonate, aluminum phosphomolybdate, strontium chromate, basic lead silicate or lead chromate, and other conventional additives such as surfactants and UV absorbers.

The cathodic electrodeposition paint of the present invention is usually adjusted to a nonvolatile content of 15-20% and applied electrically onto a steel substrate preferably surface treated with zinc phosphate or chromate at a bath temperature of 15°-35 ° C. at a DC voltage of 100-400 volt to a dry film thickness of 10-50 microns, preferably 20-40 microns, and then baked at a temperature of 100°-200 ° C. , preferably 140°-180° C. for 10-30 minutes. The resulting cured film will be free of oil droplet-induced craters and exhibit strong adhesion to an overcoating subsequently applied thereon.

The invention is further illustrated by the following examples in which all parts and percents are by weight unless otherwise indicated.

PRODUCTION EXAMPLE 1

Pigment Paste

Step 1:

A flask equipped with a reflux condenser, stirrer and drip funnel was charged with 1320 parts of 2-ethylhexanolhalf blocked TDI and 87.2 parts of N,N-dimethylethanolamine. The mixture was heated at 80° C. for 1 hour with stirring. To this were added 117.6 parts of 75% aqueous solution of lactic acid and 39.2 parts of butylcellosolve, and allowed to react at 65° C. for 30 minutes with stirring. A quaternizing agent having a solids content of 85% was obtained.

Step 2:

Using a similar flask equipped with a reflux condenser, stirrer and nitrogen tube, 710 parts of EPON 829 (bisphenol A epoxy resin sold by Shell Chemical Company, Epoxy equivalent 829) and 289.6 parts of polycaprolactone diol (TONE 0200 sold by Union Carbide Corporation, M.W. about 543) were allowed to react at 150°-160° C. for hour in a nitrogen gas atmosphere with stirring and then cooled to 120° C. To this were added 406.4 parts of 2-ethylhexanolhalf blocked TDI and allowed to react at 110°-120° C. for one hour. After the reaction, the mixture was diluted with 567.6 parts of butylcellosolve and cooled to 85°-90° C. Then 71.2 parts of deionized water and 496.3 parts of the quaternizing agent of Step 1 were added and allowed to react at 80°-85° C. with stirring until an acid number of 1 was reached. A vehicle resin having a solids content of 80% was obtained.

Step 3:

In a stainless steel vessel, 429 parts of the vehicle resin of Step 2, 101 parts of butylcellosolve and 470 parts of deionized water were thoroughly mixed. To this were added 78.3 parts of carbon black, 619.6 parts of kaolin, 85.6 parts of lead silicate, 71.4 parts of dibutylin oxide and 225.1 parts of deionized water. The mixture was transferred to a sand grind mill, dispersed to a particle size less than 10 microns, and then diluted with deionized water to a total solids content of 54.7 %, a resin content of 14.2% and pigment content of 40.5%.

PRODUCTION EXAMPLE 2

Crosslinker

Using a separate reactor, 291 parts of toluenediisocyanate (mixture of 2,4- and 2,6-isomers at a ratio of 80: 20) (TDI) were reacted with 218 parts of 2-ethylhexanol for 0.5 hours in a nitrogen atmosphere with stirring at 38° C. while cooling externally. The reaction mixture was then heated to 60° C. To this were added 75 parts of trimethylolpropane and 0.08 parts of dibutyltin dilaurate. The mixture was allowed to react for 1.5 hours at 121° C. until substantially all isocyanato functions disappeared when confirmed IR spectrometrically. This reaction product was diluted with 249 parts of ethylene glycol monomethyl ether to give a solution of blocked TDI having a nonvolatile content of 70%.

PRODUCTION EXAMPLE 3

Primary Cationic Film-Forming Resin 970 parts EPIKOTE 1001 (epoxy resin, sold by Yuka Shell Epoxy Company, epoxy equivalent 485) and 265 parts of polycaprolactone diol (sold under the name of TONE 0200 by Union Carbide Corporation, M.W. about 543) were placed in a suitable reactor and heated to 100° C. in a nitrogen gas atmosphere. 0.46 parts of dimethylbenzylamine were added to the mixture and allowed to react at 130° C. for 1.5 hours. Then the reaction mixture was cooled to 110° C. To this were added 110 parts of methyl isobutyl ketone (MIBK), 39.8 parts of a 73% solution of diethylenetriamine methyl isobutyl ketimine in MIBK, and 100 parts of MIBK. Then the mixture was cooled to 70° C. After adding 53.1 parts of diethylamine, the mixture was heated at 120° C. for 3 hours to give a cationic film-forming resin solution having a solids content of 87%.

PRODUCTION EXAMPLE 4

Amine-modified Acrylic Copolymer

A flask equipped with a reflux condenser, stirrer and drip funnel was charged with 60 parts of butylcellosolve and heated to 130° C. To this was added dropwise a mixture of 64.1 parts of t-butyl methacrylate, 8.6 parts of isobutyl acrylate, 15 parts of glycidyl methacrylate, 12.3 parts of 2-hydroxyethyl methacrylate and 3.2 parts of azobisisobutyronitrile (AIBN) over three hours, and then the mixture was allowed to react at 130° C. for an additional 30 minutes. After the addition of a mixture of 8 parts of butylcellosolve and 0.2 parts of AIBN dropwise over 30 minutes, the mixture was allowed to react again at 130° C. for an additional 1 hour to give a solution of an acrylic copolymer having a solids content of 58%. The resin had a number average molecular weight of 5,000, a Tg of 66.8° C., an SP value of 10.2 and a hydroxyl number of 53.0.

After cooling, the resin solution was allowed to react with 7.5 parts of N-methylethanol amine at 120° C. for 2 hours. The resulting amine-modified resin solution was neutralized with 2.1 parts of glacial acetic acid and then emulsified with 356.2 parts of deionized water. An acrylic emulsion having a solids content of 20% was produced.

PRODUCTION EXAMPLE 5

Analogous to Production Example 4, 72.7 parts of t-butyl methacrylate, 12.3 parts of 2-hydroxyethyl methacrylate and 15.0 parts of glycidyl methacrylate were copolymerized to obtain a copolymer having a Tg of 84.1° C. and a hydroxyl number of 53.0. This copolymer was reacted with N-methylethanolamine, neutralized with glacial acetic acid, and emulsified with deionized water to give an acrylic emulsion having a solids content of 20%.

PRODUCTION EXAMPLE 6

Analogous to Production Example 4, 59.1 parts of t-butyl methacrylate, 12.3 parts of 2-hydroxyethyl methacrylate, 13.6 parts of 2-hydroxypropyl methacrylate and 15.0 parts of glycidyl methacrylate were copolymerized to obtain a copolymer having a Tg of 72.2° C. and hydroxy number of 106.0. This copolymer was processed as in Production Example 4 to produce an acrylic emulsion having a solids content of 20%.

PRODUCTION EXAMPLE 7 (for comparison)

Analogous to Production Example 4, 72.7 parts of styrene, 12.3 parts of 2-hydroxyethyl methacrylate and 15.0 parts of glycidyl methacrylate were copolymerized to obtain a copolymer having a Tg of 79.6 ° C. and hydroxyl number of 53.0. This copolymer was processed as in Production Example 4 to produce an acrylic emulsion having a solids content of 20%.

PRODUCTION EXAMPLE 8 (for comparison)

Analogous to Production Example 4, 72.7 parts of n-butyl acrylate, 12.3 parts of 2-hydroxyethyl methacrylate and 15.0 parts of glycidyl methacrylate were copolymerized to obtain a copolymer having a Tg of $-35.3°$ C. and a hydroxyl number of 53.0. This copolymer is processed as in Production Example 4 to produce an acrylic emulsion having a solids content of 20%.

PRODUCTION EXAMPLE 9 (for comparison)

Analogous to Production Example 4, 72.7 parts of t-butyl methacrylate, 12.3 parts of PLACCEL FM-1, and 15.0 parts of glycidyl methacrylate were copolymerized to obtain a copolymer having a Tg of 73.1° C. and a hydroxyl number of 28.3. This copolymer was processed as in Production Example 4 to produce an acrylic emulsion having a solids content of 20%.

PRODUCTION EXAMPLE 10

Step 1:

A flask as used in Production Example 4 was charged with 222 parts of isophoronediisocyanate and 35.6 parts of MIBK, and heated to 70° C. To this were added 0.2 parts of dibutyltin oxide and then 98 parts of furfuryl alcohol dropwise while keeping the inner temperature at 70°–80° C. Then the mixture was allowed to react at 70° C. for 1 hour to give a half blocked isophoronediisocyanate solution having a solids content of 90%.

Step 2:

A separate flask as used in Production Example 4 was charged with 60 parts of xylene and heated to 130 ° C. To this was added dropwise a mixture of 59.1 parts of t-butyl methacrylate, 15 parts of glycidyl methacrylate, 12.3 parts of 2-hydroxyethyl methacrylate, 13.6 parts of 2-hydroxypropyl methacrylate and 3.2 parts of AIBN over 3 hours. The mixture was allowed to react at 130° C. for 3 hours. After the addition of 0.5 parts of AIBN in 8 parts of xylene over 20 minutes, the mixture was allowed to react again at 130 ° C. for 1 hour to obtain an acrylic copolymer solution having a solids content of 58%. The resin had a number average molecular weight of 5,000, a Tg of 72.2° C., an SP of 10.7 and a hydroxyl number of 106.0. After cooling, 7.5 parts of N-methylethanolamine were added to the resin solution and allowed to react at 120° C. for 2 hours to obtain an amine-modified acrylic resin.

Step 3:

To the solution of the amine-modified acrylic resin produced in Step 2 were added 0.2 parts of dibutyltin dilaurate and 35.6 parts of the solution of half blocked isophoronediisocyanate produced in Step 1. The mixture was allowed to react at 60°–70° C. until no absorption of isocyanato group was detected by the IR spectrometry of the product. Then the product was diluted with 17.8 parts of butylcellosolve to a solids content of 60%, neutralized with 2.1 parts of glacial acetic acid, and emulsified in 462.8 parts of deionized water to obtain an emulsion of an adduct of amine-modified acrylic copolymer and half blocked diisocyanate.

PRODUCTION EXAMPLE 11

A flask equipped with a reflux condenser, stirrer and drip funnel was charged with 60 parts of butylcellosolve and heated to 130° C. To this was added dropwise a mixture of 59.1 parts of t-butylmethacrylate, 15 parts of glycidyl methacrylate, 12.3 parts of 2-hydroxyethyl methacrylate, 13.6 parts of 2-hydroxypropyl methacrylate and 3.2 parts of AIBN over three hours, and then allowed to react at 130° C. for 30 minutes. After the addition of 0.5 parts of AIBN in 8 parts of butylcellosolve over 20 minutes, the mixture was allowed to react again at 130 ° C. for 1 hour to give a solution of an acrylic copolymer having a solids content of 58%. The resin had a number average molecular weight of 5,000, a Tg of 72.2° C., an SP of 10.7 and a hydroxyl number of 106.0.

After cooling, 7.5 parts of N-methylethanolamine were added to the acrylic copolymer solution and allowed to react at 120° C. for 2 hours to obtain an amine-modified acrylic resin. The resin was cooled again and thoroughly mixed with 65.8 parts of crosslinker produced in Production Example 2. After the addition of 2.1 parts of glacial acetic acid, the resin-crosslinker mixture was emulsified in 523 parts of deionized water to give an acrylic emulsion containing a crosslinker. The solids content was 20%.

EXAMPLE 1

310 parts of crosslinker produced in Production Example 2, 576 parts of cationic film-forming resin solution produced in Production Example 4 and 71 parts of ethylene glycol monohexyl ether were thoroughly mixed, neutralized with 12.3 parts of glacial acetic acid, and diluted gradually with 705.5 parts of deionized water. This liquid was mixed uniformly with 266 parts of acrylic emulsion produced in Production Example 4 and 347.8 parts of pigment paste produced in Production Example 1. The mixture was then diluted with 2652 parts of deionized water to obtain a cathodic electrodeposition paint having a solids content of 20%.

EXAMPLES 2-5

Example 1 was followed except that the acrylic emulsion of Production Example 4 was replaced by one of the acrylic emulsions of Production Examples 5, 6, 10 and 11, respectively.

COMPARATIVE EXAMPLE 1

Example 1 was followed except that the acrylic emulsion of Production Example 4 was not added and the amount of pigment paste of Production Example 1 was changed to 313 parts.

COMPARATIVE EXAMPLES 2-4

Example 1 was followed except that the acrylic emulsion of Production Example 4 was replaced by one of the acrylic emulsions of Production Examples 7-9, respectively.

EVALUATION

Paints of Examples 1-5 and Comparative Examples 1-4 were each applied on a zinc phosphate-treated cold rolled steel plate by immersing the plate in a paint bath as a cathode and passing DC current at 200 volt for 3 minutes. The resulting paint film was rinsed with water and baked at 180° C. for 20 minutes to give a film thickness of 20 microns. The results of evaluation are collectively shown in Table 1.

Evaluation Method:

1. Overcoating adhesion:

The electrodeposition paint film was overlaid with an alkyd evercoating paint by spraying the alkyd paint to a dry film thickness of 35 microns and baking at 140° C. for 30 minutes. Then the overcoating film was scratched, according to JIS K5400-1975 6.15, into 100 grid segments each being of size 1 mm × 1 mm. Then a pressure sensitive adhesive tape was applied on the grid and stripped off rapidly. The evaluation was made by counting the number of grid segments remaining on the electrodeposition paint film.

2. Suscesptibility to oil droplet-induced craters:

Using the above conditions, each cathodic paint was coated on a cold rolled steel plate of 70 mm × 150 mm size after the addition of 30 ppm of a press-cleaning oil as droplets. The number of craters created by the oil droplets on the cure paint film was visually counted and judged by the following schedule.
○:0-2; Δ:3-10; x:>10

3. Surface smoothness:

The finished paint film was visually examined for undulations and other irregularities.

TABLE 1

| Item | Paint Evaluation Example | | | | | Comparative Ex. | | | |
|---|---|---|---|---|---|---|---|---|---|
| | 1 | 2 | 3 | 4 | 5 | 1 | 2 | 3 | 4 |
| Overcoating adhesion | 100 | 100 | 100 | 100 | 100 | 100 | 100 | 0 | 50 |
| Oil-droplets induced craters | ○ | ○ | ○ | ○ | ○ | X | X | Δ | ○ |
| Surface smoothness | Good | Good | Good | Good | Good | Good | Good | Good | Good |

We claim:

1. A cathodic electrodeposition paint comprising an aqueous dispersion of a primary cationic film-forming resin and 1 to 30% by weight of the total resin content of the entire paint of an auxiliary amine-modified acrylic resin in the form of an aqueous emulsion, wherein said amine-modified acrylic resin is a reaction product produced by reacting a secondary amine and an oxirane ring-containing acrylic copolymer to open the oxirane ring with said amine, and wherein the acrylic copolymer has a number average molecular weight from 1,000 to 20,000 and is produced by copolymerizing a monomeric mixture comprising (a) t-butyl acrylate or methacrylate in a proportion sufficient to provide a glass transition temperature in the acrylic copolymer of at least 50° C., (b) a hydroxyl group-containing acrylic monomer in a proportion sufficient to provide a hydroxyl number in the acrylic copolymer of greater than 40, and (c) an oxirane ring-containing acrylic monomer in a proportion sufficient to provide an oxirane ring content in the acrylic copolymer of from 0.5 to 2.5 mmol/g.

2. The cathodic electrodeposition paint according to claim 1, wherein said amine-modified acrylic resin is further reacted with a half blocked organic diisocyanate.

3. The cathodic electrodeposition paint according to claim 1, wherein the total resin content further comprises an amine-modified epoxy resin produced by reacting an epoxy resin with an amine to open the epoxy group with the amine and a blocked polyisocyanate.

4. The cathodic electrodeposition paint according to claim 2, wherein the total resin content further comprises an amine-modified epoxy resin produced by reacting an epoxy resin with an amine to open the epoxy group with the amine and a blocked polyisocyanate.

5. The cathodic electrodeposition paint according to claim 1, wherein the proportion of t-butyl acrylate or methacrylate is 50 to 80% by weight of said monomeric mixture.

6. The cathodic electrodeposition paint according to claim 1, wherein said secondary amine is a secondary alkanolamine.

7. The cathodic electrodeposition paint according to claim 1, wherein said monomeric mixture further comprises an alkyl acrylate or methacrylate other than t-butyl acrylate or methacrylate, acrylo- or methacrylonitrile, acryl- or methacrylamide, styrene, vinyltoluene, α-methylstyrene, vinyl acetate, or mixtures thereof.

8. The cathodic electrodeposition paint of claim 1, wherein the acrylic copolymer has a glass transition temperature of 50° to 84.1° C.

9. The cathodic electrodeposition paint of claim 1, wherein the acrylic copolymer has a hydroxyl number of greater than 40 to 106.

10. The cathodic electrodeposition paint of claim 1, wherein the hydroxyl group-containing acrylic monomer (b) is 2-hydroxyethyl (meth)acrylate, 2-hydroxypropyl (meth)acrylate or polycaprolactone glycol (meth)acrylate.

11. The cathodic electrodeposition paint of claim 1, wherein the oxirane ring-containing acrylic monomer (c) is glycidyl (meth)acrylate.

12. The cathodic electrodeposition paint of claim 1, wherein the secondary amine is N,N-diethylamine, N,N-dibutylamine, N-methylethanolamine or diethanolamine.

* * * * *